March 1, 1955

F. J. NEUGEBAUER 2,703,102

SPRING LOADED VALVE FOR HIGH-SPEED
AIR AND GAS COMPRESSORS

Filed Dec. 28, 1951

INVENTOR.
FRANZ J. NEUGEBAUER

BY Wade Loomis
ATTORNEY

Charles L. Burgoyne
AGENT.

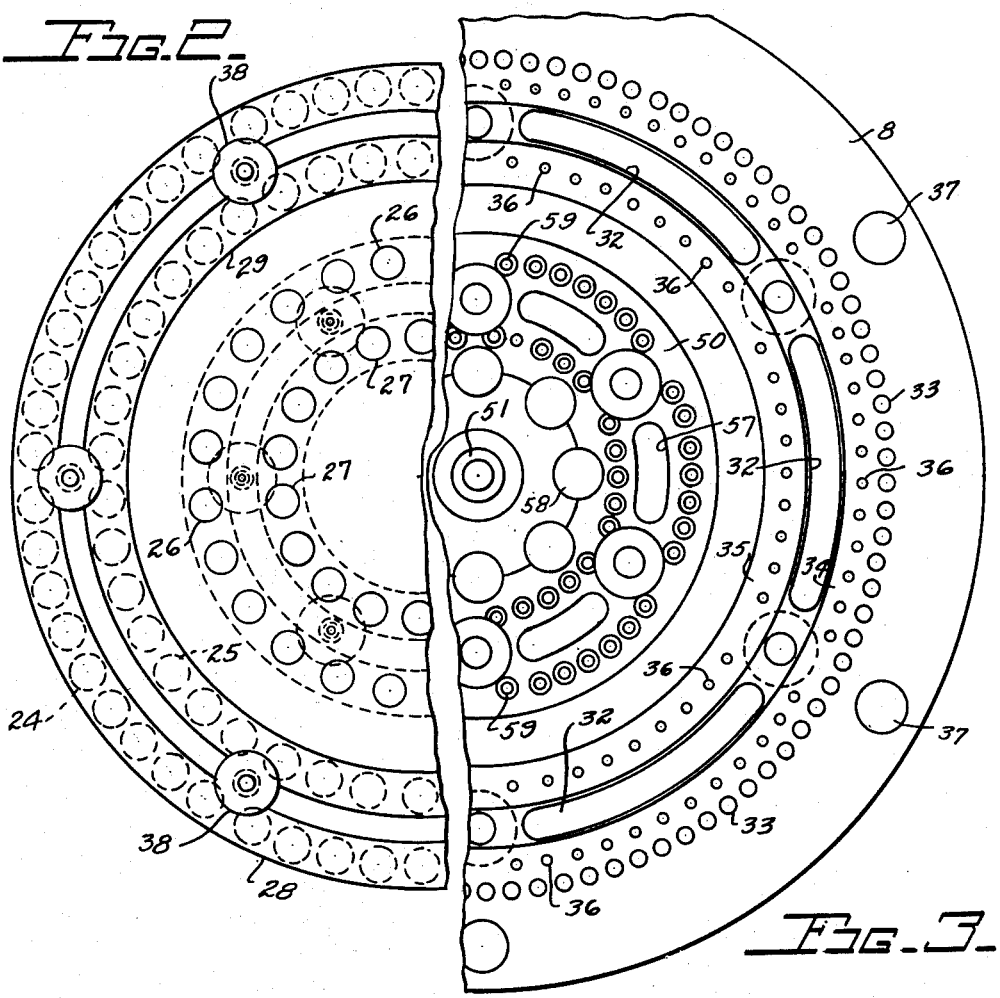
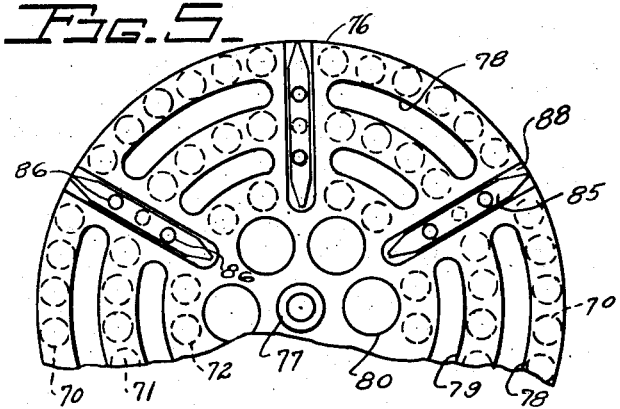

March 1, 1955

F. J. NEUGEBAUER 2,703,102

SPRING LOADED VALVE FOR HIGH-SPEED
AIR AND GAS COMPRESSORS

Filed Dec. 28, 1951

INVENTOR.
FRANZ J. NEUGEBAUER
BY Wade Koonty
ATTORNEY
Charles L. Burgoyne AND
AGENT United States Patent Office 2,703,102
Patented Mar. 1, 1955

2,703,102

SPRING LOADED VALVE FOR HIGH-SPEED AIR AND GAS COMPRESSORS

Franz J. Neugebauer, Schenectady, N. Y., assignor to the United States of America as represented by the Secretary of the Air Force Application December 28, 1951, Serial No. 263,947

4 Claims. (Cl. 137—493.8)

(Granted under Title 35, U. S. Code (1952), sec. 266)

The invention described herein may be manufactured and used by or for the United States Government for governmental purposes without payment to me of any royalty thereon.

This invention relates to spring loaded valves for high speed air and gas compressors characterized by having large cross sectional areas for the flow of gas and by having a minimum of inertia in the moving parts.

The primary object of the invention is to provide a valve construction for air and gas compressors wherein a plurality of flat concentric valve rings normally seat over and close a concentric group of circularly arranged gas flow apertures in an associated valve plate, wherein short tubular elements slidably mounted on guide pins are provided to extend between and maintain the valve rings in uniformly spaced relation at their peripheral edges, wherein the tubular elements include flange means to contact one side of adjacent valve rings remote from the associated valve plate, and wherein springs surrounding the tubular elements constantly bias the tubular elements and the concentric valve rings toward the associated valve plate.

Another object of the invention is to provide a valve construction for air and gas compressors wherein a plurality of flat concentric valve rings normally seat over and close a concentric group of circularly arranged gas flow apertures in an associated valve plate, wherein a plurality of flat radially extending pressure plates are constantly maintained in yielding contact with the side of the valve rings remote from the associated valve plate, and wherein projections on one side of the pressure plates extend between and maintain the valve rings in uniformly spaced relation at their peripheral edges.

Another object of the invention is to provide an outlet valve construction for air and gas compressors wherein a plurality of flat concentric valve rings normally seat over and close a concentric group of circularly arranged gas flow apertures in an associated valve plate, wherein a valve limiting plate is mounted over and slightly spaced from the valve rings, wherein a stud or post extends upwardly from the valve limiting plate, and wherein a member mounted on the stud includes laterally projecting arms extending radially outwardly to engage under an annular shoulder forming part of the side walls of a compressed gas outlet of the compressor.

A further object of the invention is to provide a valve construction designed for high speed gas compressors, wherein the valve guide means moves with the valve to eliminate valve wear.

The above and other objects of the invention will become apparent upon reading the following detailed description in conjunction with the accompanying drawings, in which:

Fig. 1 is a central longitudinal cross section taken through a cylinder and cylinder head of a gas compressor to show one embodiment of spring loaded valve.

Figs. 2 and 3 are fragmentary cross sectional views taken on lines 2—2 and 3—3 respectively of Fig. 1.

Fig. 5 is a fragmentary cross sectional view taken on line 5—5 of Fig. 4.

Conventional gas compressors are comparatively slow running machines and are also apt to be heavy and cumbersome because of their slow speed characteristics. Responsibility for the slow speeds may usually be attributed directly to the use of conventional spring-loaded inlet and outlet valves, such as poppet valves. These conventional valve devices have too many design limitations. High speed compressors require large flow cross sections and consequently valves with a large cross sectional area. Such valves tend to be heavy and at high speeds their inertia slows the valve action. To minimize these inertial effects the valves are made very thin. But valves are usually maintained in position by guide means against which the valve rubs during the operation of the gas compressor. This rubbing action wears away the thin valves very rapidly causing uneven valve seating. The valve constructions disclosed herein overcome some or all of the above enumerated difficulties and disadvantages and thus result in improved compressor operation, lighter weight and a saving in materials and costs of manufacture.

Figure 1:
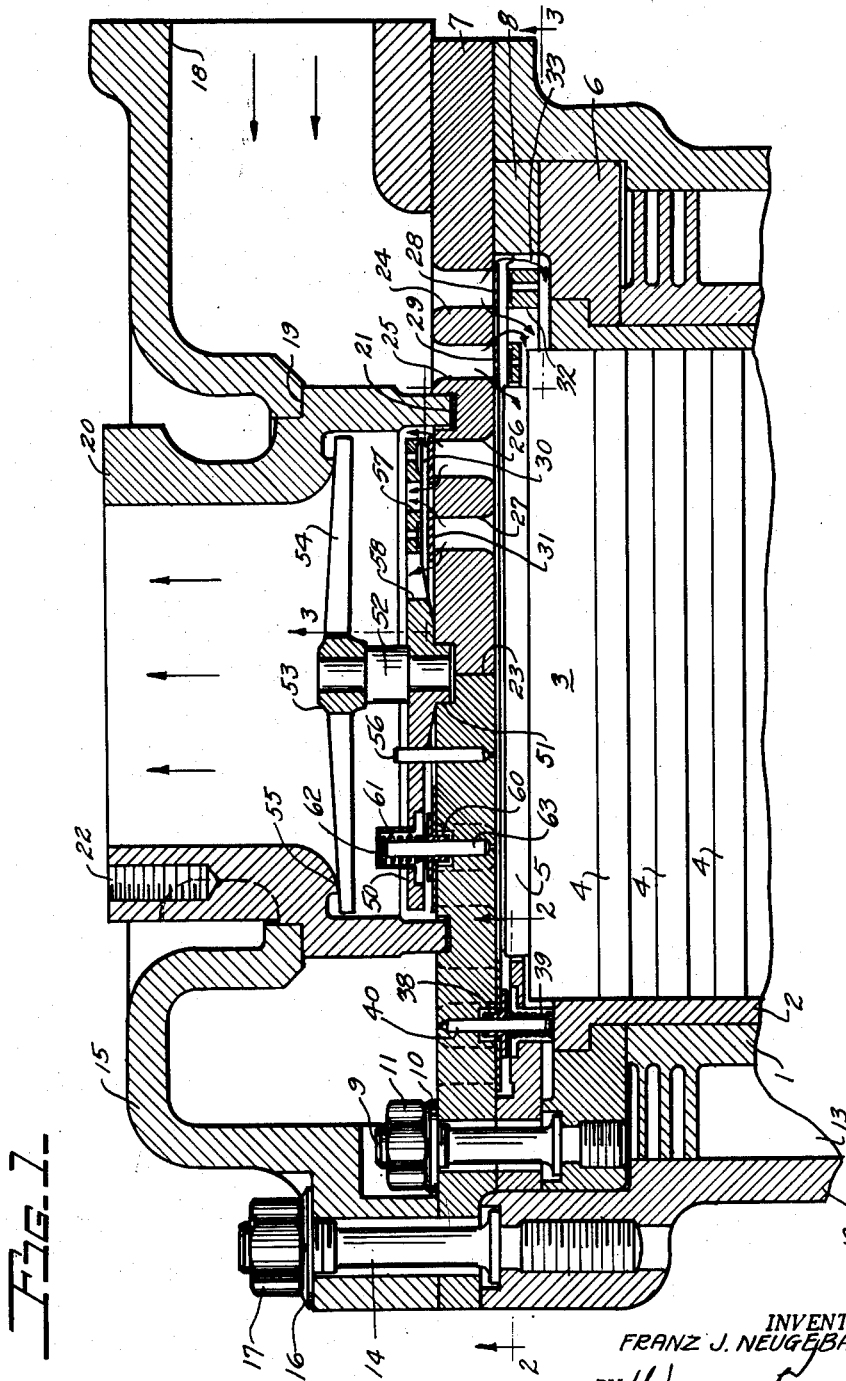

Considering first the valve constructions of Fig. 1 it will be seen that the compressor includes a cylinder liner 2 having a cooling jacket including casing 1 therein with a piston 3 slidable vertically within the liner 2. The piston includes piston rings 4 of any desired type. The piston includes a crown portion 5 of lesser diameter than the piston proper, this crown portion helping to fill the cylinder completely in the upper dead-center position of the piston so as to reduce the clearance volume to an absolute minimum. As will be understood, the piston is actuated by any suitable stroke performing mechanism such as a crankshaft and connecting rod (not shown). The cylinder liner 2 has a force fit in a surrounding ring or frame plate 6 and secured between the ring 6 and a cylinder head plate 7 is an inlet valve stop plate or ring 8. A plurality of stud bolts 9 are anchored in the ring 6 and mounted on the upper ends are washers 10 and nuts 11 as shown.

The casing 1 is fitted within a cylinder jacket 12 providing an annular space 13 therebetween which may be used for the circulation of a fluid cooling medium to carry off the heat of compression. Studs 14 anchored in the jacket 12 extend upwardly through the cylinder head plate 7 and also through the head jacket or inlet manifold 15. Washers 16 and nuts 17 on the studs 14 act to retain the inlet manifold in place. The manifold is formed with a gas receiving opening or conduit 18 for making a connection to a source of low pressure gas. In a central location the manifold 15 is provided with a circular opening or conduit, the edge of which forms a shoulder seating as at 19 against a circular shoulder on an outlet or exhaust manifold 20. The lower circular edge of the manifold 20 seats in a groove 21 provided with a sealing gasket of flat circular form. The upper edge of the outlet manifold 20 is squared off and provided with several tapped openings, as at 22, to facilitate connection with a high pressure conduit leading the compressed gas to a point where it is used or to another cylinder for further compression.

The head plate 7 extending through the compressor transversely of the cylinder may be divided diametrically, as at 23, for ease in manufacture. However, in Fig. 3 such diametrical division of the plate is not included. The plate is provided with two outer circular series of gas inlet holes 24 and 25 and two inner circular series of gas outlet holes 26 and 27. The outer holes are normally covered or closed by a pair of flat concentric rings 28 and 29, while the inner holes are normally closed by a pair of flat concentric rings 30 and 31. The rings 28 and 29 are below the holes 24 and 25, since these rings are displaced downwardly by the suction effect of the downwardly moving piston on the suction stroke. The rings 30 and 31 are above the holes 26 and 27, since these rings are displaced upwardly by the compressive effect of the upwardly moving piston on the compression stroke. The largest valve rings 28 and 29 forming the gas inlet valves are limited in the extent of their opening movement by upwardly facing portions of the inlet valve stop plate 8 and extending therethrough are arcuate slots 32 (see Fig. 3) through which uncompressed gas is drawn on the suction stroke of the piston. Such flow will be between the rings 28 and 29 after passing downwardly through the holes 24 and 25. To provide even more inlet passages there may be a circular series of holes 33. On both sides of the arcuate slots 32 are valve stop ledges 34 and 35 of circular form just slightly narrower than the ring valves 28 and 29, these ledges forming valve limiting means to prevent unnecessary reciprocating movement of the valve rings. The valve limiters are provided with small holes 36 to prevent any tendency of the valve rings to stick due to the vacuum effect of close contact over an appreciable area. The screw studs 9 which hold the head plate 7 and stop plate 8 in assembled relation on the cylinder pass through the holes 37 in the stop plate. In order to spring bias the valve rings 28 and 29 into the upward or valve closing position, there are provided a series of flanged sleeves 38 situated between the two rings 28 and 29 with the flanges extending under the rings and exerting upward pressure thereon in conjunction with compression coil springs 39. The sleeves and coil springs are mounted on vertical guide pins or posts 40 having a drive fit in the head plate 7. It will be understood that the inlet manifold 15 extends clear around the series of gas inlet passages 24 and 25 and that when the piston 3 makes a suction stroke the low pressure gas of large volume flows past the valve rings 28 and 29 and into the cylinder, as shown by the curved arrows (Fig. 1). On the return or compression stroke the high pressure gas of small volume flows upwardly through the passages 26 and 27 and forces the outlet valve rings 30 and 31 off the valve seats, so that the compressed gas is then free to flow quickly past the rings and into the outlet manifold 20.

The details of construction of the exhaust or outlet valves will now be described. The valve rings 30 and 31 normally cover the gas outlet passages 26 and 27 and are spaced only slightly below a circular plate 50 having a central boss 51 extending downwardly into a shallow opening in the head plate 7 for positioning of the plate or disk 50. A central post 52 having one end in the center of the boss 51 extends upwardly into a multiple-armed spider 53, the radially-extending arms of which are somewhat springy to allow for slight variations in dimensions of the various parts. The outer ends of these arms 54 extend under a circumferential downwardly facing portion or shoulder 55 of the manifold 20. The plate 50 is prevented from turning about the center by means of a locating pin 56 extending through the plate and into the head plate 7. The plate 50 is provided with a series of arcuate gas passages 57 and also a series of circular holes 58 close to the center thereof. Two circular series of small apertures 59 in the valve lift limiting portions of the plate 50 prevent the formation of a vacuum in the open position of the valve rings and thereby prevent possible sticking of the valves in their open position. The valve rings 30 and 31 are biased to their closed position, as shown, by means of flanged sleeves 60 extending between the rings and having the annular flanges thereof held in contact with the rings by means of compression coil springs 61 in abutment with the flanges of the sleeves and with the upper ends of small housing parts 62. Guide pins or posts 63 set into the head plate 7 serve to locate and guide the sleeves 60 and springs 61.

Figure 4:
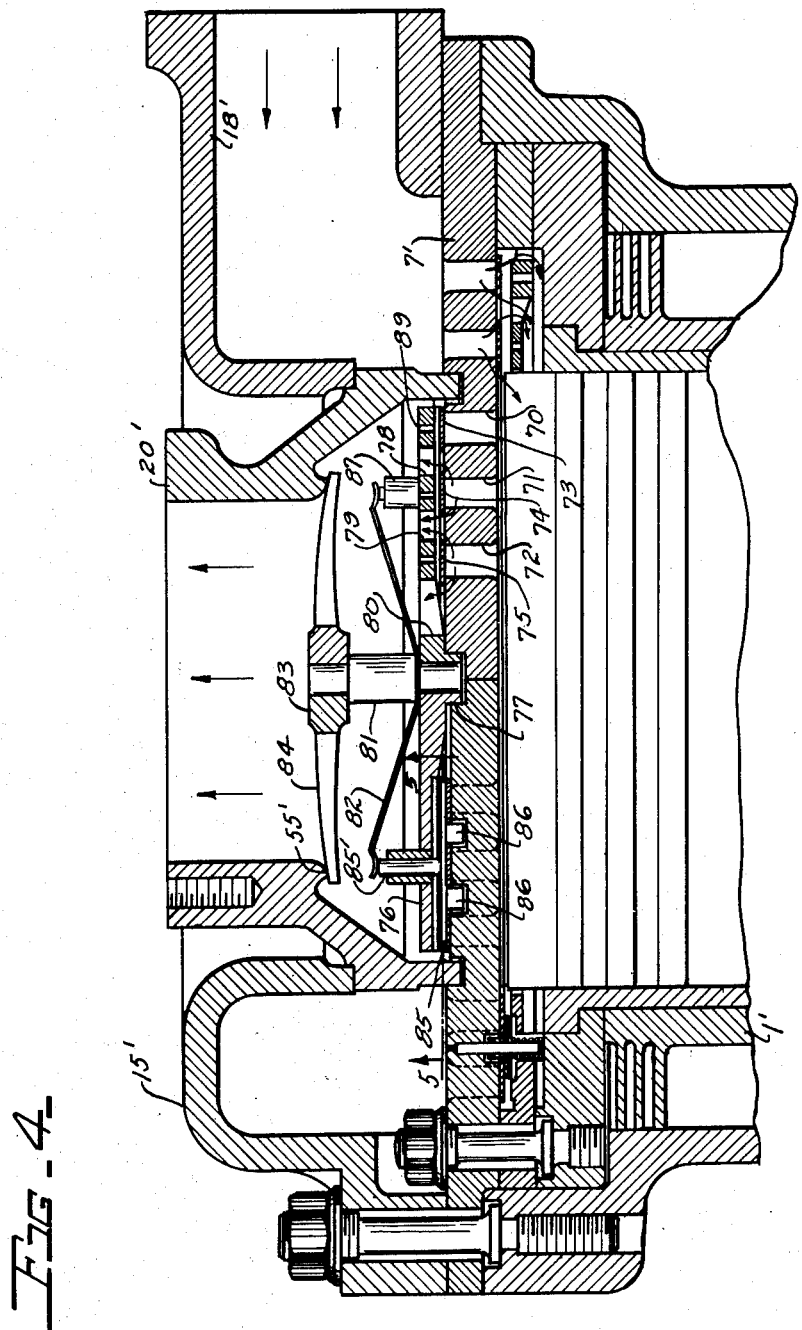
Fig. 4 is a central longitudinal cross section taken through a cylinder and cylinder head of a gas compressor to show a second embodiment of spring loaded valve.

Considering now the modified construction of Fig. 4 it will be seen that the arrangement of cylinder, piston, gas inlet and outlet manifolds and inlet valves is exactly like that of Fig. 1. The only difference is in the exhaust valves and the description will be confined to this modified structure entirely. The head plate 7' in Fig. 4 is provided with three series of gas outlet passages 70, 71 and 72 arranged in a concentric circular fashion. These passages are normally closed or covered by three concentric valve rings 73, 74 and 75 made of some durable metal, such as high-grade stainless steel.

Spaced slightly above the valve rings is a circular plate or lift limiter 76. A central boss 77 on the underside of the plate 76 is used to properly locate the plate by virtue of an interfitting engagement in a complementary recess in the head plate 7'. The plate 76 is provided with two series of arcuate gas passages 78 and 79 between the valve rings 73, 74 and 75 and also a series of circular gas passages 80 adjacent to the inner valve ring 75. When the valve rings lift off the gas passages 70 to 72 because of the compression of gas in the cylinder 1', the flow then proceeds upwardly through the passages 78 to 80, as shown by the small curved arrows, into the outlet manifold 20'. The plate 76 is retained in place by means of a central stud 81 having one end extending into the central boss 77 and having an enlarged middle portion bearing on a one-piece spring member 82 and also on the plate 76. The upper end portion of the stud 81 extends into a multiple-armed spider 83 including arms 84 extending radially outwardly for engagement under an annular shoulder 55' of the manifold 20'. As in Fig. 1, the arms 84 are slightly springy to allow for limited bending thereof in assembling the compressor.

The outward ends of the respective fingers on the spring member 82 engage on top of stem portions 85' of the inverted T-shaped pressure members 85. Short downwardly extending projections 86 on the members 85 fit between the valve rings, while the lower face portions of the members 85 continuously contact the upper sides of the rings to urge the valve rings to valve closing position, as shown. The stem portions 85' are guided by means of sleeve elements 87 rigidly connected to the plate 76. On the lower face the plate 76 is radially recessed as at 88 (Fig. 5) to prevent any rotative movement of the members 85 about the stems 85'. Where the valve rings contact the lift limiting plate 76 there are provided a multiplicity of small holes 89 to prevent the formation of a vacuum along the flat contacting surfaces. Thus, it will be seen that a gas outlet valve construction is provided in which the lightweight valve rings are maintained in evenly spaced relation by spring biased members which act on the valve rings to normally maintain them in closed position and in which the spring biased members are mounted on guides for sliding movement, in order to act as valve ring carriers and thus, eliminate sliding contact between the valve rings and guide means therefor.

The embodiments of the invention herein shown and described are to be regarded as illustrative only and it is to be understood that the invention is susceptible of variations, modifications and changes within the scope of the appended claims.

I claim:

1. A valve system adapted for use with a gas compressor comprising, a headplate, a plurality of concentric circularly disposed arrays of gas flow passages extending through the headplate, a plurality of radially spaced valve rings coextensive with the concentric circularly disposed arrays of gas flow passages, said valve rings positioned on opposite surfaces of the headplate to constitute inlet and outlet valves for the gas compressor, a plurality of guideposts projecting from at least one side of the headplate and extending between adjacent concentric and coplanar valve rings, flanged sleeves slidably mounted on said guide posts and extending between said valve rings, said flanged sleeves acting to maintain said valve rings in proper position, the flanged portions of said sleeves bearing against the valve rings on the face side remote from the headplate to move with said valve rings; and resilient means on each of said posts contacting said flanged portions to bias the valve rings into sealing engagement with the gas flow passages in the headplate.

2. A valve system comprising a headplate, a plurality of concentric circularly disposed arrays of gas flow passages extending through said headplate, a plurality of valve rings coextensive with said concentric circularly disposed arrays of gas flow passages, guide means extending between adjacent edges of the valve rings and movable therewith to properly position them, a valve ring lift limiting plate having a central boss, said boss in contact with the headplate to space said limiting plate from said valve rings, a plural armed member having a central portion in abutment with said limiting plate, a fixed annular shoulder associated with the headplate and contacted by the arms of said plural armed member to secure said limiting plate in position on said headplate, and means positioned axially of said headplate and connected to said valve rings to spring bias said valve rings against said headplate to seal the gas flow passages.

3. A valve system adapted for use with a gas compressor comprising a headplate, a plurality of concentric circularly disposed arrays of inlet and outlet gas flow passages extending through said headplate, a plurality of radially spaced valve rings adapted to close said gas flow passages, spacing means on at least one side of the headplate connected to said valve rings and movable therewith, said spacing means having upstanding stems and depending projections, said depending projections extending between said valve rings to maintain proper valve ring spacing, a valve ring lift limit plate spaced from said headplate, guide means rigid with said lift limit plate to receive the upstanding stems on said spacing means, a spring unit having a plurality of diverging spring fingers mounted on said lift limit plate, said spring fingers engaging the stem of said spacing means to bias said valve rings into closing position.

4. A valve system for a gas compressor comprising a headplate, a plurality of concentric circularly disposed arrays of gas flow inlet and outlet passages, a plurality of valve rings constituting inlet and outlet valves, disposed on the opposite surfaces of the headplate coextensive with said concentric circularly disposed arrays of gas flow passages, resilient means for biasing said valve rings in closed position, a valve lift limiting means mounted on the headplate, retaining means mounted on the valve lift limiting means, for securing said limiting means in position, pressure plates engaging the valve rings on at least one surface of the headplate and movable therewith, said pressure plates having projections extending between said valve rings to maintain them in proper position and means connected to the pressure plates, extending through the valve limiting means in contact with said resilient means, whereby said valve rings are biased into closed position.

References Cited in the file of this patent

UNITED STATES PATENTS

| | | |
|---|---|---|
| 1,012,359 | Iversen | Dec. 19, 1911 |
| 1,553,323 | Parks | Sept. 15, 1925 |
| 1,682,908 | Osgood | Sept. 4, 1928 |
| 1,707,306 | Holdsworth | Apr. 2, 1929 |
| 1,886,190 | Hodsdon | Nov. 1, 1932 |
| 2,124,323 | Voss | July 19, 1938 |
| 2,297,942 | Collins | Oct. 6, 1942 |
| 2,595,986 | Schwaller | May 6, 1952 |